MORGAN W. BROWN, OF NEW YORK, N. Y.

Letters Patent No. 89,198, dated April 20, 1869.

---

IMPROVEMENT IN COMPOSITIONS FOR COATING PAPER, FOR MANUFACTURE OF NECK TIES, CRAVATS, AND OTHER ARTICLES OF WEARING-APPAREL.

---

The Schedule referred to in these Letters Patent and making part of the same.

---

*To all whom it may concern:*

Be it known that I, MORGAN W. BROWN, of the city of New York, in the county and State of New York, have invented a new and useful Mode, or Process for a Composition of Matter for Preparing and Treating Paper for Neck-Ties, Gloves, and Wearing-Apparel; and I do hereby declare that the following is a full and exact description thereof.

The nature of my invention consists in the preparation, admixture, and the uses of a chemical combination for a composition of matter, which I treat, saturate, coat, and combine with paper of every kind and form, preparatory to its uses and application for all articles of dress and wearing-apparel, (and as a substitute for cloth, silk, &c.,) for male or female uses, plain, or ornamental, as cravats, or neck-ties, bosoms, handkerchiefs, gloves, &c.

To enable others skilled in the art to make, prepare, and use my invention, I will proceed to describe the mode, or process of the manufacture of the composition of matter, and its uses and application to paper, or paper-fibre, preparatory to and for the purposes herein set forth.

First, I dissolve, or saturate one part, by weight, of gum-tragacanth in from about forty to fifty parts of a weak solution of glycerine, the specific gravity of the solution of glycerine being about 10° Baumé, or it may be used at from five to ten degrees specific gravity. The solution is better by being gently heated, but can be prepared at common temperatures. I use the admixture of these substances, in the opaque form, as a mucilage, and forming, after being prepared, one of the vehicles used in the composition of matter for treating the paper.

Second, I now dissolve, by a gentle heat, one part of gelatine in from four to six or more parts, by weight, of clean, pure water. I now use about one part, by weight, of glycerine, or from one to one and a quarter parts to the solution composed of gelatine and water, while hot, and the whole are to be well incorporated while fluid. The glycerine I use white, or pale straw-color, of specific gravity 25° to 27° Baumé, or thereabouts.

Third, I now use, or admix well together, by heat, in any suitable vessel, (the heat, in most all cases, to be used below 200° Fahrenheit,) about one part of the first solution with two parts of the second solution, or more, or less of each, and this forms the composition of matter, which I apply fluid and hot, or warm, to the paper, or paper-fibre, for toughening, and for softening the same.

Fourth, I apply this composition to the paper in the fluid form, by passing it from rolls, or in sheets through the solution in a bath, or by means of saturating, and impregnating by coating with a brush, as well as by immersion, and use, in some cases, two or more coatings, and sufficient to form a strong body.

Fifth, I use, in some cases, on one or on both surfaces of the paper, after it has been treated (or where one surface has been coated) with the composition, and the same has become dry, a coating of alkaline-silicate, in solution of from 20° to 25° specific gravity, Baumé, to render all the colors contained in the paper, (or, that I apply to them in combination with the composition used previously,) for the purposes of rendering one or both sides of the paper insoluble to water, and also, for fixing the colors.

Sixth, I use, in the solution of alkaline-silicates, also, colors; but prefer to use, in most cases, any and all coloring-matters and pigments, mixed with the composition of matter, as set forth in the third article contained herein.

Seventh, I prepare and treat any paper that has been previously ornamented, colored, gilded, or embossed on one surface, the same as plain, or uncolored paper, with the composition of matter.

I do not confine myself to the exact proportions of water used, or the specific gravity of the glycerine used, or the temperatures, but I can produce a better result by about the proportions, &c., named, and can use a more common, or cheaper article of the raw materials contained in the composition, to a good advantage, and producing a very similar result.

I can use paper composed of wood, or straw-fibre, as well as the manilla-fibre, to a good advantage; also, writing, printing, or wrapping-paper, and the better quality of paper used for hangings.

The paper, after treatment in the manner herein set forth, is flexible, tenacious, and firm against injury, and even by age it improves in these qualities.

For articles of dress, as those in very common use, where the styles and colors are continually changing, paper, being the cheapest known material, is well adapted, by this mode of treatment, as a substitute for cloth in cravats, ties, collars, gloves, handkerchiefs, caps, &c.

What I claim as my invention, and desire to secure by Letters Patent, is—

The mode, or means of preparing and manufacturing a composition of matter, for treating and preparing paper and paper-fibre, preparatory to and for its uses and application to the manufacture of paper neck-ties, or cravats, gloves, mittens, caps, collars, and articles of dress, wear, and utility, substantially as herein described and set forth.

MORGAN W. BROWN.

Witnesses:
WM. F. MCNAMARA,
JOHN J. MCINTYRE.